United States Patent [19]

Vieira et al.

[11] Patent Number: 5,560,666
[45] Date of Patent: Oct. 1, 1996

[54] REMOVABLE RACK SYSTEM

[76] Inventors: Glenn R. Vieira, 17191 Friml La., Huntington Beach, Calif. 92649; Arnold Schnetzler, 11822 Louis St., Whittier, Calif. 90605

[21] Appl. No.: 434,375

[22] Filed: May 3, 1995

[51] Int. Cl.$^6$ .................................................. B60P 3/00
[52] U.S. Cl. ........................ 296/3; 224/402; 224/405; 296/43; 410/116; 414/462
[58] Field of Search .......................... 296/3, 26, 43; 224/402, 403, 405, 488, 489; 414/462; 280/491.5, 491.1, 415.1; 410/101, 106, 108, 110, 116, 32, 34, 153, 155, 121, 77

[56] References Cited

U.S. PATENT DOCUMENTS

| | | | |
|---|---|---|---|
| 2,570,802 | 10/1951 | Hatteburg | 296/3 X |
| 4,234,284 | 11/1980 | Hauff | 414/462 |
| 4,381,069 | 4/1983 | Kreck | 224/402 X |
| 4,389,067 | 6/1983 | Rubio | 296/50 |
| 4,405,170 | 9/1983 | Raya | 296/10 |
| 4,531,774 | 7/1985 | Whatley | 296/43 X |
| 4,630,990 | 12/1986 | Whiting | 224/403 X |
| 4,770,458 | 9/1988 | Burke et al. | 296/3 |
| 4,813,584 | 3/1989 | Wiley | 224/42.44 |
| 4,867,497 | 9/1989 | Jayne | 296/3 |
| 4,932,703 | 6/1990 | Chamberlin et al. | 296/26 |
| 4,938,399 | 7/1990 | Hull et al. | 224/42.43 |
| 5,029,740 | 7/1991 | Cox | 280/415.1 X |
| 5,116,096 | 5/1992 | Taylor | 296/3 |
| 5,181,822 | 1/1993 | Allsop et al. | 224/402 X |
| 5,190,337 | 3/1993 | McDaniel | 296/3 |
| 5,238,280 | 8/1993 | Christensen | 296/3 |
| 5,267,748 | 12/1993 | Curran | 280/415.1 |
| 5,423,566 | 6/1995 | Warrington et al. | 280/491.5 X |

OTHER PUBLICATIONS

Photographs of Commerical Compression Fittings, Keeper Corporation, Willmantic, Connecticut, Part No. 05604 (Date Unknown).

Primary Examiner—David M. Mitchell
Assistant Examiner—Kia M. Robinson
Attorney, Agent, or Firm—Knobbe, Martens, Olson & Bear

[57] ABSTRACT

A removable rack system provides the ability to carry elongated loads and is easily and simply installed and removed without the use of special tools or other equipment. The rack system includes a rear rack having a hitch tongue which is releasably connected to a conventional hitch receiver of the truck. A center post extends upward from the hitch tongue and supports a cross member at its upper end. The cross member may be of such a height that it can be used in conjunction with a removable front rack located near the cab of the truck. The front rack can support elongated loads that extend above the cab of the truck.

22 Claims, 5 Drawing Sheets

REMOVABLE RACK SYSTEM

BACKGROUND OF THE INVENTION

1. Field of the Invention

The present invention relates in general to a cargo storage system for a vehicle and, in particular, to a rack system for supporting elongated items on a vehicle.

2. Description of Relevant Art

Many vehicle owners frequently haul materials or items that are longer in length than the carrying capacity of the vehicle. This is especially true for pickup truck owners who commonly carry loads which are longer than the length of the truck bed.

Transporting elongated loads in a pickup truck often is cumbersome because one or both ends of the elongated load must extend beyond the ends of the truck bed. The extent to which the load can extend beyond the rear end of the truck also is limited by road safety rules.

Truck owners also commonly tie down or secure the loads to the truck in an awkward manner, which frequently results in an unstable and dangerous loading. The elongated load can easily shift or move, and even fall from the moving truck. The elongated load also may scratch the paint and damage the exterior surface of the truck when secured in a haphazardly manner.

To improve the transportation of elongated loads in pickup trucks, permanent and semi-permanent racks have been used, but prior racks tend to be bulky and awkward to use. For instance, many contractors and tradesmen permanently install a rack on their truck to carry larger items, such as ladders, pipes and sheets of plywood or drywall. These racks generally extend upwardly from the sidewalls of the truck bed and typically form a large, permanently-joined structure that is fixed to the truck bed. The joined sections of prior truck racks also generally include legs or other supporting members that are permanently or semi-permanently attached to the sidewalls and floor of the truck bed. U.S. Pat. No. 5,190,337 issued to McDaniel, discloses an example of a typical prior rack Used with pickup trucks.

Although prior racks are useful in carrying elongated loads, the size and mounting arrangement of prior racks make them difficult and cumbersome to install and remove. Prior permanently installed racks also tend to limit the usefulness of the truck because the rack tends to interfere with the loading of other items into the truck bed. For instance, prior racks generally have various supports and trusses which extend into or across the truck bed and are fastened to the sides and/or the floor of the truck bed. Items thus must be loaded beneath and between the legs or supports of the rack. Prior carrying rack designs have limited the usefulness and loading capacity of the truck bed.

Moreover, many people who use their trucks for work do not want their truck encumbered with a large, permanently attached, expensive rack when not at work. Such racks tend to spoil the aesthetics and overall usefulness of the truck. And prior racks are difficult to remove from the truck bed and store when not in use.

SUMMARY OF THE INVENTION

A need therefore exists for a removable rack system that is easily and simply attached to a vehicle without the use of special tools and equipment. The rack system also should securely and safely carry elongated loads without significant modification to the vehicle.

In accordance with one aspect of the present invention, the rack system allows an elongated load to be easily carried on a vehicle which includes a hitch receiver. The rack system comprises a rear rack including a hitch. The hitch is adapted to releasably engage the hitch receiver of the vehicle. The hitch is configured to extend beyond an end of the vehicle. A post of the rear rack extending upward from the hitch to a position at least above the end of the vehicle. The post supports a cross member which is attached to the post at a position above the end of the vehicle.

Another aspect of the present invention involves a rack system for securing an elongated load to a truck. The truck includes a cab and a truck bed which is formed in part by a floor, a pair of upstanding sidewalls, and a tailgate. The truck also includes a hitch receiver which is positioned beneath and at the rear of the truck bed. The rack system includes a front rack having a truss attached to and supported by a pair of spaced upstanding legs. At least two compression fittings are used to releasably attach the front rack to the truck bed. For this purpose, each compression fitting is connected to one of the legs and is adapted to engage a stake well in one of the sidewalls of the truck bed.

An additional aspect of the present invention involves a rack system for a truck having truck bed including a floor and a tailgate. The truck also includes a hitch receiver positioned below the tailgate. The rack system comprising a tailgate fence which includes a hitch adapted to releasably engage the hitch receiver of the truck. The hitch is configured to extend beyond an end of the truck. A post extends upward from the hitch to a position at least above the floor of the truck bed. A cross member is attached to the post with a plurality of extensions attached to the cross member. The extensions lie at least partially above the floor of the truck bed.

In accordance with a preferred method of attaching a rack system to a truck, a rear rack of the rack system is provided. The rear rack includes a hitch tongue which is configured to engage a hitch receiver of the truck. The hitch tongue of the rear rack is inserted into the hitch receiver and is releasably secured therein. With the hitch tongue properly positioned, a post of the rear rack is positioned such that a cross member attached to the post lies above the tailgate of the truck.

BRIEF DESCRIPTION OF THE DRAWINGS

These and other features of the invention will now be described with reference to the drawings of preferred embodiments, which are intended to illustrate and not to limit the invention and in which.

DETAILED DESCRIPTION OF THE PREFERRED EMBODIMENTS

Figure 1:
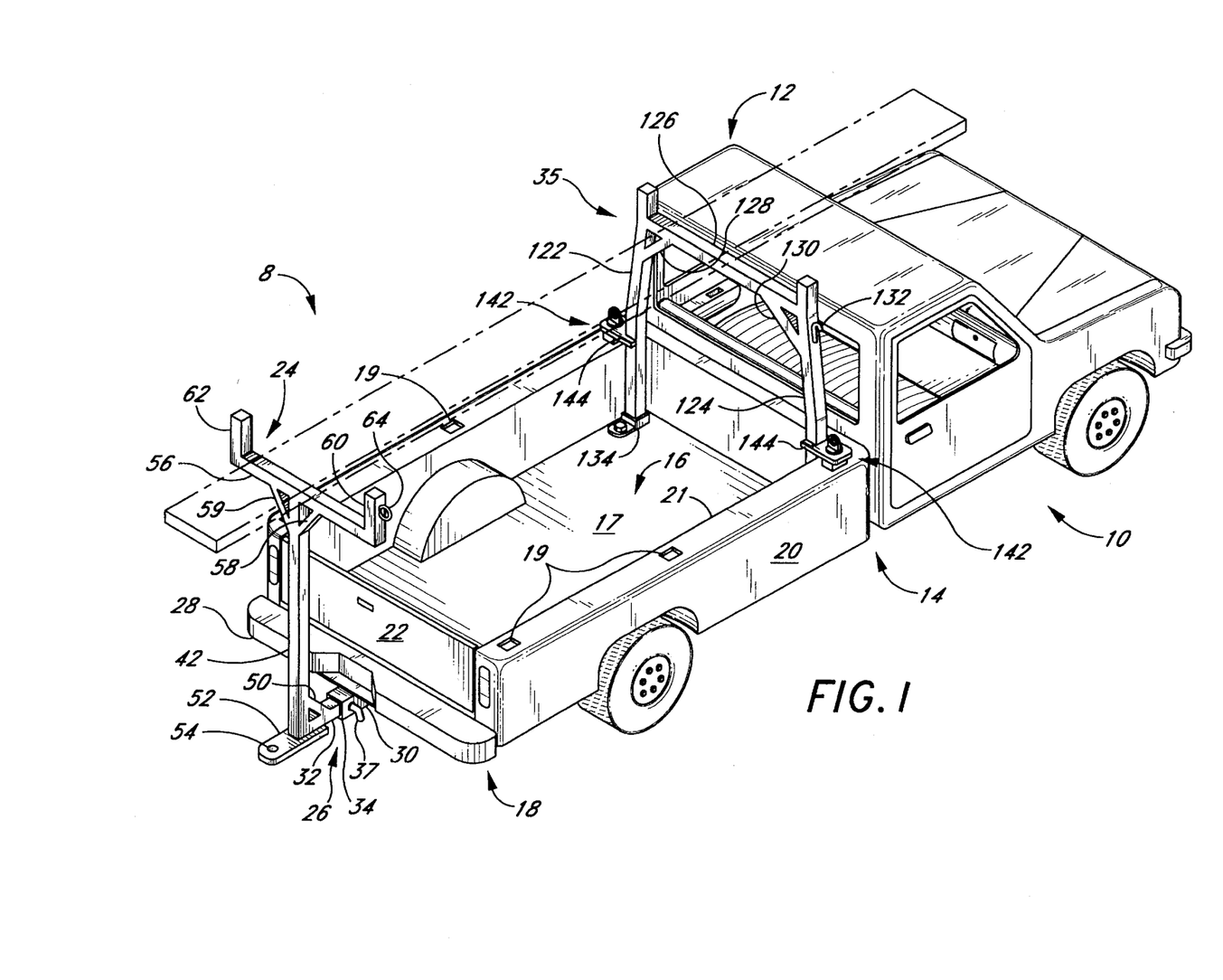
FIG. 1 is a rear perspective view of a rack system in accordance with a preferred embodiment of the present invention, as attached to a conventional pickup truck.

FIG. 1 illustrates a rack system 8 which is configured in accordance with a preferred embodiment of the present invention. The rack system 8 is particularly well suited for use with a conventional vehicle, such as, for example, a pickup truck 10 of the type illustrated in the accompanying figures. It will be readily understood and appreciated, however, that the present rack system 8 can be used with vehicles of different sizes and classes. For instance, the present rack system 8 has equal applicability for full-size, mid-size or compact pickup trucks. A rear portion of the rack system 8 also may be used with a variety of other vehicles, such as Suburbans, Broncos, station wagons, or the like. The present rack system 8 thus can be used with a wide range of vehicles.

Before describing the present rack system 8 in detail, an exemplary truck 10 first will be described to assist the reader in understanding the present rack system 8. As seen in FIG. 1, the truck 10 includes a cab 12 at the front end 14 of the truck 10 and a truck bed 16 toward the rear end 18 of the truck 10. The truck bed 16 has a conventional rectangular shape and includes upright sidewalls 20 extending from the cab 12 to the rear end 18 of the truck 10. Each sidewall 20 includes several stake wells 19 spaced along the length of the sidewall 20. The stake wells 19 are generally rectangular openings that are surrounded by an upper rim or lip 21 of the truck sidewall 20. The stake wells 19 open into an inner space within the sidewalls 20 or into the truck bed 16.

The truck 10 also includes a tailgate 22 attached to the rear end 18 of the truck bed 16. The tailgate 22 extends between the sidewalls 20 of the truck 10 to close the bed 16. A bumper 28 commonly extends along the rear end of the truck bed 16 beneath the tailgate 22.

The truck 10 also includes a conventional hitch receiver 30 which is attached to the frame of the truck 10 by conventional means, such as by welding. The hitch receiver 30 comprises a generally square tubular member, which is adapted to receive a hitch tongue. The hitch receiver 30 commonly is about two inches (5 cm) square in cross-sectional shape and typically is made of a heavy metal, such as iron or steel. The hitch receiver 30 generally extends rearwardly from the center of the truck 10; however, it will be understood that the hitch receiver 30 can be located in a variety of positions relative to the truck 10. In its conventional position, an opening 34 of the hitch receiver 30 is located beneath the rear bumper 28 of the truck 10 to allow insertion of a conventional trailer hitch or a portion of the rack system 8, as described below.

As seen in FIG. 1, the present rack system 8 includes a front rack 35 attached at the front end of the truck bed 16 and a rear rack 24 which is attached to the truck 10 by a hitch 26. The hitch 26 releasably engages the conventional hitch receiver 30 which allows the rear rack 24 to be detachably connected to the truck 10.

The hitch 26 includes a hitch tongue 32 and an extension 52. The hitch tongue 32 is configured and sized to slidably engage the hitch receiver 30. The hitch tongue 32 desirably has a uniform cross-sectional shape which corresponds with the shape of the hitch receiver 30, but is slightly smaller in size to be easily inserted into the hitch receiver 30.

The hitch tongue 32 has a sufficiently long length such that when the hitch tongue 32 is inserted into the hitch receiver 30, the hitch tongue 32 extends beyond the rear end of the bumper 28. In this manner, the rear rack 24 does not contact any portion of the truck 10 (including the bumper 28) other than the hitch receiver 30, nor is it supported by any other portion of the truck 10. The length of the hitch tongue, however, desirably is as short as possible for stability and safety purposes. In some applications it may be desirable to have the hitch tongue 32 extend from the hitch receiver 30 by a sufficient distance to allow the tailgate 22 to be opened and closed with the rear rack 24 attached to the truck 10.

In the illustrated embodiment, the hitch tongue 32 is preferably about 12 inches (30 cm) in length. Of course, the length of the hitch tongue 32 can be varied to suit a specific application. For instance, the hitch tongue 32 may be 24 inches (60 cm) in length or longer to allow, the tailgate 22 to open. The hitch tongue 32 also can be adjustable in length.

Figures 3, 4:
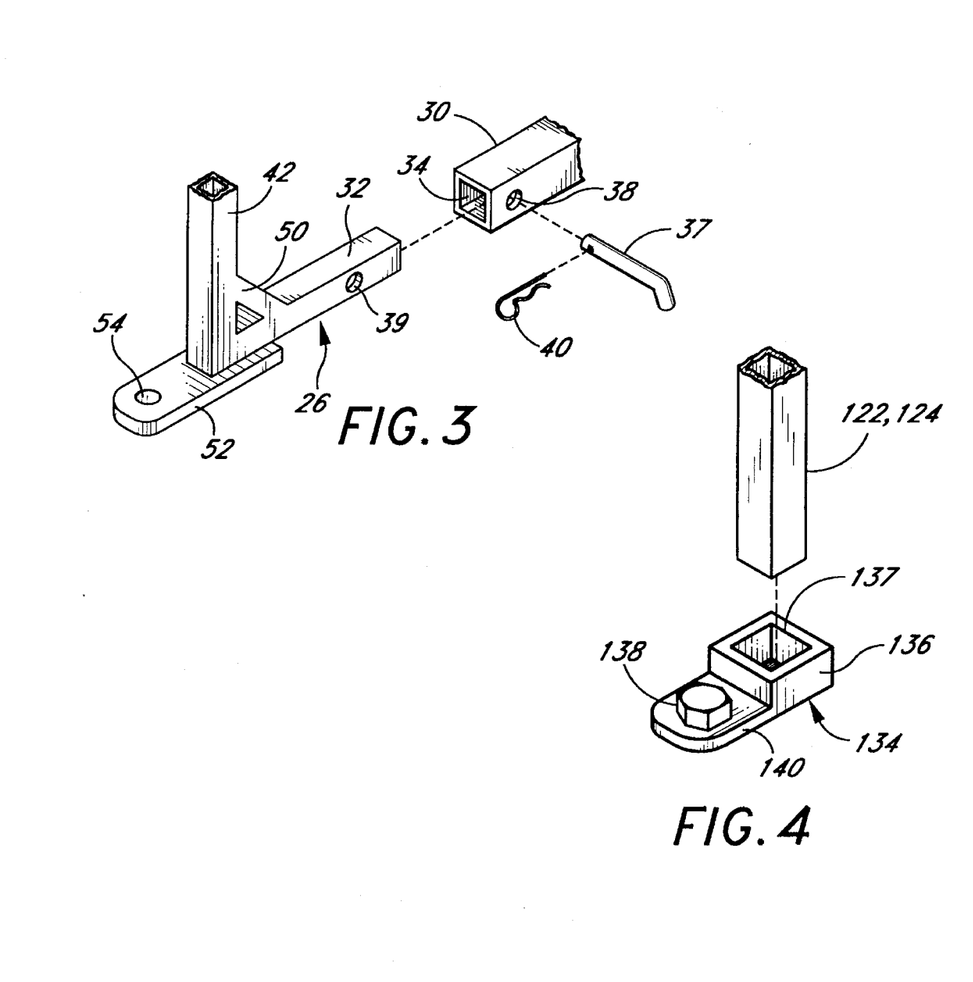
FIG. 3 is an enlarged, exploded perspective view of a hitch of the rack system of FIG. 1 and a conventional hitch receiver.
FIG. 4 is an enlarged, exploded perspective view of a footing and a portion of a leg of the rack system of FIG. 1.

As best seen in FIG. 3, at least one lock pin 37 releasably connects the hitch tongue 32 to the hitch receiver 30. The pin 37 extends through corresponding apertures 38, 39 in the hitch receiver 30 and hitch tongue 32, respectively. The lock pin 37 prevents relative movement and disconnection of the hitch tongue 32 from the hitch receiver 30. As understood from FIG. 3, the lock pin 37 extends through the hitch receiver 30 and hitch tongue 32 such that a hitch pin cotter 40 may be releasably connected to the end of the lock pin 37 to prevent accidental removal of the pin 37. This releasable engagement between the hitch tongue 32 and the hitch receiver 30, which is locked by the pin 37, secures the rear rack 24 to the truck 10. The rear rack 24, however, can be quickly and easily disconnected by removing the lock pin 37 and disengaging of the hitch tongue 32 for the hitch receiver 30.

With reference to FIG. 1, the extension 52 off the hitch 26 extends rearwardly from the hitch tongue 32. In the illustrated embodiment, the extension 52 is a relatively flat metal member that includes an aperture 54 located on the rear side of the hitch tongue 32. The extension 52 is attached to the hitch tongue 32 by means such as bolts or welding. The extension 52 allows other objects to be connected to the rear rack 24. For example, a conventional trailer hitch ball (not shown) may be connected to the extension 52 to create a trailer hitch. This allows the truck 10 to tow a trailer or another vehicle with the rear rack 24 installed.

Figure 2:
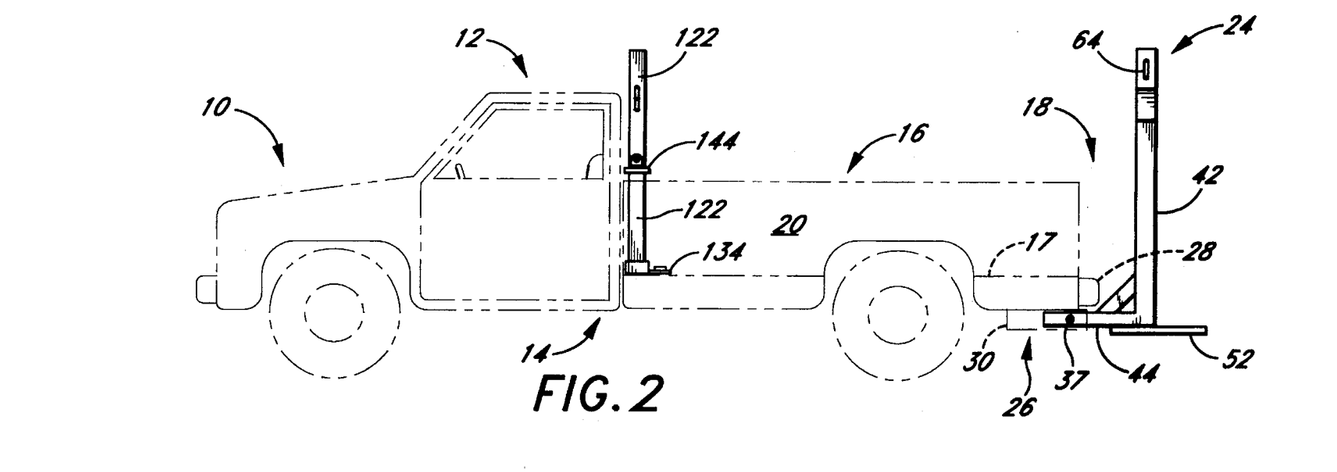
FIG. 2 is a side elevational view of the truck rack of FIG. 1.

As seen in FIGS. 1 and 2, the rear rack 24 includes an elongated, generally upright center post 42 that is integrally connected to the hitch tongue 32. The center post 42 generally extends perpendicularly to the hitch tongue 32 with a support 50 bracing the connection between the hitch tongue 32 and the center post 42. The support 50 preferably extends between the hitch tongue 32 and the center post 42 at about a 45° angle relative to both members 32, 42.

The center post 42 desirably extends from the hitch tongue 32 to a height which is proximate to or slightly above the roof of the cab 12. For this purpose, in the illustrated embodiment, the length of the center post 42 is preferably about 57 inches (145 cm). It should be recognized, and understood, however, that center post 42 can have any of a wide variety of lengths to suit a specific application, and can even be adjustable in height.

An upper cross member 56 is connected to an upper end of the center post 42. The cross member 56 preferably extends perpendicular to the center post 42 in a direction which is generally parallel to the truck bed 16 and to the tailgate 22. The cross member 56 preferably is centrally located on the center post 42. This causes an elongated load supported by the rear rack 24 to be generally centered relative to the width of the truck bed 16 and relative to the center post 42 which is supporting the load. Angled supports 58, 59 brace the cross member 56 on the top of the center post 42.

The position of the cross member 56 on the center post 42, however, can vary in order to suit a specific application. The cross member 56 also could be adjustable so as to attach to the center post 42 at several different locations along the length of the post 42. It also should be understood that the post 42 could support more than one cross member 56, with each cross member 56 possibly having different lengths.

The cross member 56 desirably has a length less than the width of the truck bed 14. In the illustrated embodiment, the cross member 56 has a length of about 28 inches (70 cm). This length will accommodate the shorter end of all conventional ladder, yet is not so wide as to cause the rear rack 24 to teeter or require additional bracing. Of course, it will be readily appreciated that cross members of longer and shorter lengths can be used with the present rear rack 24 to suit specific applications.

Extensions 60, 62 flank the ends of the cross members 56. The extensions 60, 62 are preferably about 6 inches (15 cm) in length and are attached perpendicularly to the cross member 56 so as to extend upwardly in a direction generally parallel to the center post 42. The extensions 60, 62 prevent the elongated load from moving or sliding off the ends of the cross member 56.

The extensions 60, 62 can include one or more hooks or tie downs to which ropes, straps, cords or the like can be attached to tie the elongated load to the cross member 56. As seen in FIG. 1, these hooks or tie downs desirably are located on the outer sides of the extensions 60, 62. In the illustrated embodiment, each tie down is a circular ring 64 that is attached near the upper end of the extension 60, 62. It will be readily appreciated, however, that a wide variety of hooks or other types of known tie downs can be used as well with the present rack system 8.

Although the rear rack 24 may be constructed from a wide variety of materials, the rear rack 24 preferably is principally constructed of steel square tubing. The hitch tongue 32, central post 42, cross member 56, and extensions 60, 62 desirably are all formed of square tubing segments which are welded together in the configuration described above to form a rigid structure. The lower support 50 and upper angled supports 58, 59 also are formed of square tubular segments which are welded between the hitch tongue 32 and the central post 42, and between the center post 42 and the cross member 56, respectively. The extension 52 also is welded to the bottom surface of the hitch tongue 32. It will be recognized by one of skill in the art, however, that the rear rack 24 can be constructed of any of a wide variety of materials including, for example, steel circular tubes, channel iron, or plastic segments that are relatively strong and rigid. The material selected preferably is one that is relatively lightweight to enable a single person to easily install and remove the rear rack 24. It also should be understood that the components of the rear rack 24 may be connected by other known means besides welding, such as, for example, by conventional fasteners, including nuts and bolts.

With reference to FIG. 1, the front rack 35 of the present rack system 8 desirably is located near the front of the truck bed 16, proximate to the cab 12, though other positions in the truck bed 16 also are possible. The front rack 35 includes a pair of upstanding legs 122, 124. When installed in the truck bed 16, as seen in FIG. 2, the legs 122, 124 lie generally parallel to the rear end of the truck cab 16 and generally perpendicular to the floor 17 of the truck bed 16. As best seen in FIG. 1, the legs 122, 124 support a horizontal truss 1.26 that is preferably located at a height above the cab 12 of the truck 10 to allow an elongated load to extend above the cab 12. The legs 122, 124 may be substantially parallel or bent inwardly toward the center of the truck bed 16 at the upper ends of the legs 122, 124, as shown in FIG. 1. Angled members 128, 130 each brace the connection between the truss 126 and the corresponding leg 122, 124.

The front rack 35 can be used by itself to support elongated loads such that one end of the elongated load is placed in the truck bed 16 and the other end is placed against the truss 126. The front rack 35 also can be used in conjunction with the rear rack 24 to support the elongated load, such as the plank shown in phantom in FIG. 1. For this purpose, the height of the truss 126 desirably is the same height as the cross member 56 of the rear rack 24 so that the elongated load lies generally parallel to the floor 17 of the truck bed 16.

As seen in FIG. 1, the legs 122, 124 of the front rack 35 desirably extend above the truss 126 to help secure the elongated load on the front rack 35. The front rack 35 may include one or more hooks or tie downs to attach ropes, straps, cords or the like to the front rack 35 to tie the elongated load to the front rack 35. As shown in FIG. 1, a hook 132 may be attached to the outer side of each leg 122, to facilitate securing of the elongated load to the front rack 35 by ropes, straps or the like.

Although the legs 122, 124 and truss 126 of the front rack 35 may be constructed from any of a wide variety of materials, the legs 122, 124 and truss 126 of the front rack 35 preferably are constructed of steel square tube segments which are welded together in the configuration described above to form a rigid structure. The braces 128, 130 also are formed of square tubular segments which are welded between the legs 122, 124 and the truss 126. It will be recognized by one of skill in the art, however, that the front rack 35, like the rear rack 24, can be constructed of any of a wide variety of materials including, for example, steel circular tubes, channel iron, or plastic segments that are relatively strong and rigid. The material selected preferably is one that is relatively lightweight to enable a single person to easily install and remove the front rack 35. It also should be understood that the components of the front rack 35 may be connected by other known means besides welding, such as, for example, by conventional fasteners, including nuts and bolts.

With reference to FIGS. 1 and 4, the legs 122, 124 of the front rack 35 are secured to the floor 17 of the truck bed 16 by a pair of footings 134. As seen in FIG. 4, each footing 134 includes a bracket 136 with an aperture 137. The aperture 137 is configured and shaped to receive and engage a lower end of the corresponding leg 122, 124 of the front rack 35. In this manner, each footing 134 prevents lateral movement of the lower end of front rack 35 in the truck bed 16 when each leg 122, 124 is inserted into the corresponding footing aperture 137.

Each footing 134 desirably is removably attached to the floor 17 of the truck bed 16 by a bolt 138 or similar means that extends through a flange 140 of the footing 134. As seen in FIG. 1, each footing 134 preferably is oriented so as to place the legs 122, 124 of the front rack 35 generally flush against the front end of the truck bed 16. The flanges 140 of the footings 134 can be arranged to extend along the sidewalls 20 of the truck bed 16, as shown in FIG. 1, or along the front wall of the truck bed 16.

The low profile of the footings 134 minimizes any interference which the footings 134 may cause when loading items into the truck bed 16 with the rack system 8 removed. To further minimize any interference caused by the footings 134, the footings 134 desirably are positioned in front of the wheel wells within the truck bed 16, as illustrated in FIG. 1.

The front rack 35 is releasably secured to the truck 10 by a pair of compression fittings 142 that fit into the stake wells 19 of the truck bed sidewalls 20. The compression fittings 142 can k,e of any known type, such as, for example, chrome stake pocket anchors, which are available commercially from Keeper Corporation of Willmantic, Conn., Part No. 05604. A pair of side plates 144 support the compression fittings 142 in a manner allowing the fittings 142 to engage the stake wells 19 with the legs 122, 124 of the front rack 35 inserted into the footings 134 in the truck bed 16.

As best seen in FIG. 1, the side plates 144 extend to the side of the corresponding leg 122, 124 in a direction out of the truck bed 16. Each side plate 144 is attached to a lower vertical section of the corresponding leg 122, 124 and extends generally perpendicular to the lower leg vertical section. The side plates 144 are positioned on the respective leg 122, 124 at a height which generally corresponds to the height of the truck bed sidewall 20.

Figure 5:
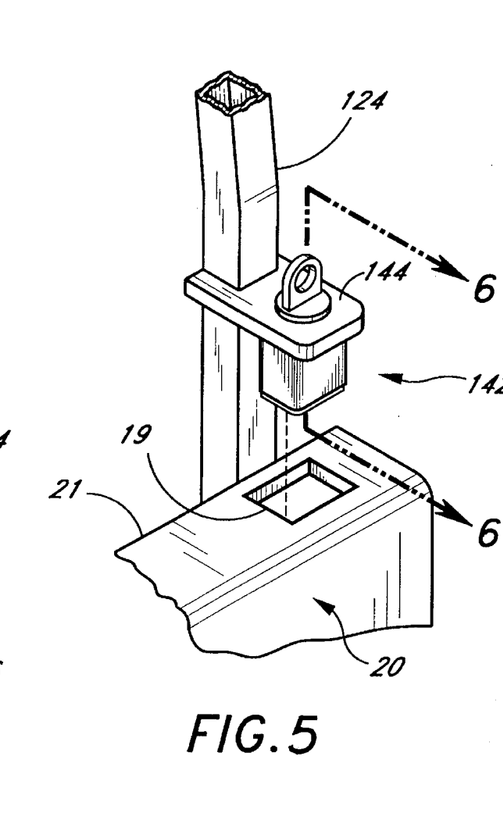
FIG. 5 is an enlarged, exploded perspective view of a releasable compression fitting of the rack system of FIG. 1.

FIG. 5 illustrates an enlarged view of the right side plate 144 and compression fitting 142 in a position above a corresponding stake well 19. It is contemplated that the left side plate 144 and compression fitting 142 are substantially identical to the right side plate 144 and compression fitting 142 and, therefore, the description herein of the right side plate 144 and compression fitting 142 will be understood as applying equally to both unless indicated to the contrary.

As seen in FIG. 5, the side plate 144 has a width which is wider than the width of the front rack leg 124 so as to surround a portion of the leg 124. The side plate 144 also has a width which is wider than the stake well opening 19 in order for at least a portion of the side plate 144 to lie on top of the lip 21 of the sidewall 20 and support the compression fitting 142 within the stake well 19, as described below. It should be understood, however, that the size and shape of the side plate 144 can vary, provided that the side plate 144 connects the compression fitting 142 to the corresponding leg 122, 124 of the front rack 35 and is configured to engage a portion of the sidewall lip 21 with the compression fitting 142 inserted into the corresponding stake well 19.

Figure 6:
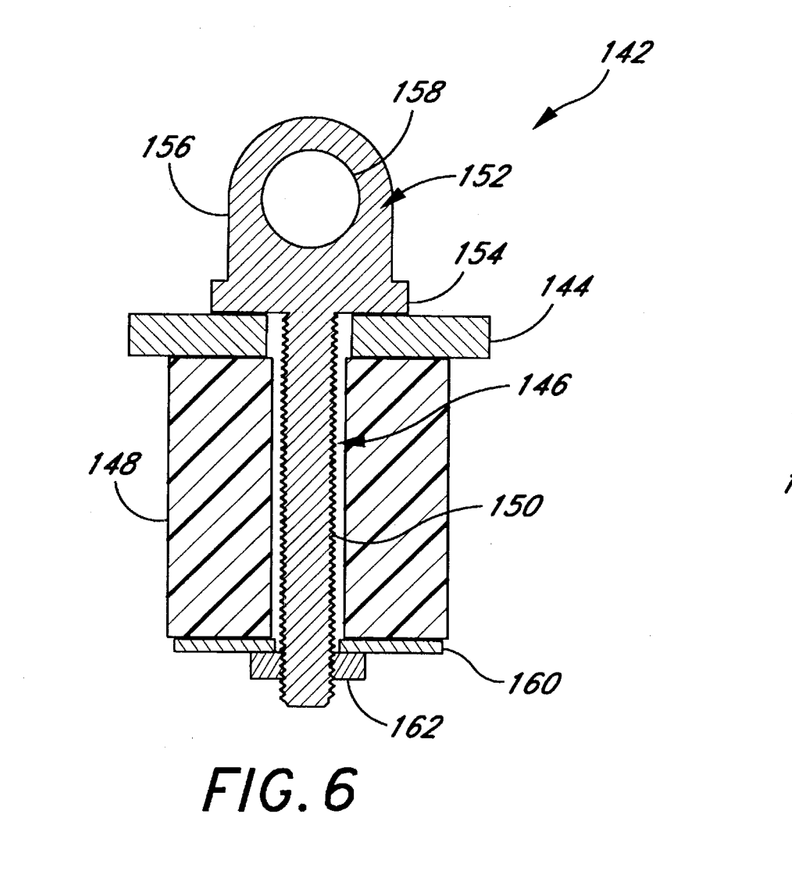
FIG. 6 is a cross-sectional view of the compression fitting of FIG. 5 taken along line 6–6, illustrating the fitting in an untightened state.

FIG. 6 illustrates the components of an exemplary embodiment of the compression fitting 142 used with the front rack 35 of the present rack system 8. The compression fitting 142 includes a bolt 146 that extends through an elastic or resilient bushing 148. The bolt 146 includes a threaded shank 150 which extends from an eyelet head 152. In the illustrated embodiment, the eyelet head 152 has a circular collar 154 which rests on the upper surface of the side plate 144. The eyelet head 152 also includes a vertical flange 156 in which an eyelet opening 158 is formed. The eyelet head 152 provides a gripping point to rotate the bolt 146, as well as functions as a tie down to which ropes or the like can be attached.

A washer 160 is positioned over the opposite end of the threaded shank 150 so as to interpose the resilient bushing 148 between the side plate 144 and the washer 160. A nut 162 secures the washer 160 onto the end of the threaded shank 150. As best understood in FIG. 5, the washer 160 and the bushing 148 are configured to fit within the stake well 19 before the compression fitting 142 is tightened.

The front rack 35 is easily attached to the truck 10 in a releasable manner by inserting the ends of the legs 122, 124 of the front rack 35 into the corresponding footings 134 attached in the truck bed 16. The compression fittings 142 are simultaneously inserted into the corresponding stake wells 19 of the truck bed sidewalls 20 to a position where the side plates 144 rest on top of the sidewall lips 21. The compression fittings 142 are then tightened to sturdily secure the front rack 35 to the truck 10.

With reference to FIG. 6, the compression fittings 142 are tightened by rotating the bolt 146 which causes the nut 162 to travel towards the head 152 of the bolt 146. The travel of the nut 162 also forces the washer 160 towards the bolt head 152, thereby decreasing the distance between the washer 160 and the side plate 144. Thus, as the bolt rotates, the washer 160 travels up the bolt shank 150 towards the side plate 144 from an initial, untightened position in which the washer 160 is positioned at the end of the bolt shank 150.

Figure 7:
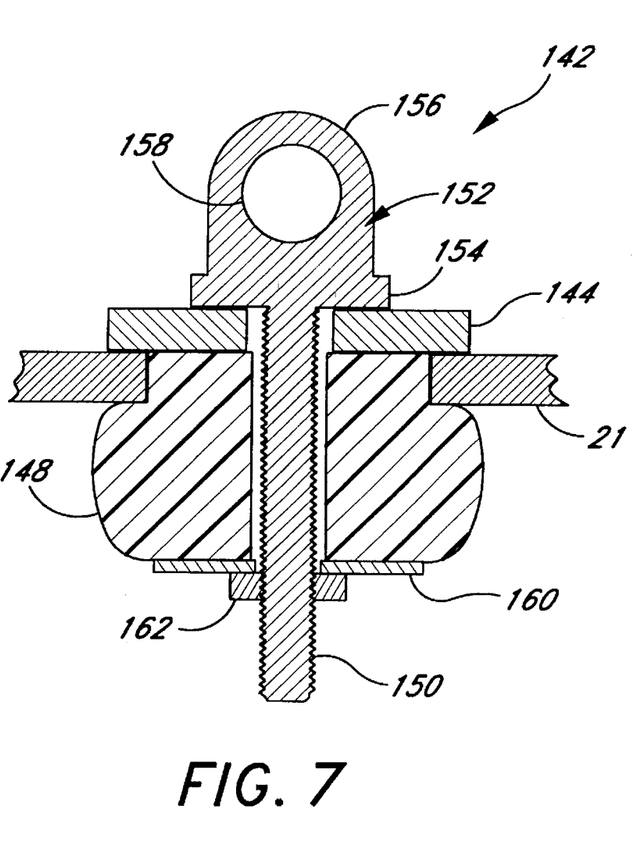
FIG. 7 is a cross-sectional view of the compression fittings of FIG. 6, schematically illustrating the fitting in a tightened state.

As illustrated in FIG. 7, the washer 160 compresses the elastic bushing 148 as the washer 160 moves over the bolt shank 150 towards the side plate 144. The washer 160 travels to a locked or tightened position, which is illustrated in FIG. 7, in which the washer 160 elastically compresses the bushing 148. The bushing 148 expands in diameter to an extent sufficient to prevent the washer 160 and the bushing 148 from pulling through the stake well opening 19. In this manner, the compression fittings 142 lock the legs 122, 124 of the front rack 35 to the truck 10 with the ends of the legs 122, 124 secured in the footings 134.

As apparent from the above description of the installation of the front and rear racks 35, 24 of the present rack system 8, the present rack system 8 is easily installed into and removed from the truck bed 16 without the need of special tools. A single person also can install and remove the rack system 8 alone.

The simple manner in which the rack system 8 is removed from the truck 10 allows the rack system 8 to be easily removed for loading large items into the truck bed 16, such as, for example, a refrigerator or the like. In addition, the rack can be easily removed to improve the aesthetics of the truck when not in use. The owner can install the rack system 8 when he or she needs it, and then remove and store it when not in use.

The two-piece component feature of the present rack system 8 also facilities compact storage of the rack system 8. The limited size of each rack component 24, 35 enables these components to be easily stored in a garage or storage area without occupying a substantial amount of space. And the front and rear racks 35, 24 do not need to be "broken-down" before storage.

It also should be understood from the foregoing that the components 24, 35 of the present rack system 8 can be used together or can be used independent of each other, depending upon the particular application of the rack system 8. For instance, the front rack 35 and the rear rack 24 desirably are configured to cooperate with each other to carry elongated items, such as, for example, extension ladders, conduit, pipes, and other lengthy materials and equipment. The present racking system 8 thus eliminates creative loading of lumber, extension ladders or pipes, and in doing so eliminates the possibility of scratches in the paint due to such creative loading. And, as mentioned above, the front and rear racks 35, 24 can be used apart from each other. The rear rack 24 also can be used with a conventional roof rack mounted on top of the roof of the truck cab 12 or on top of the roof of a vehicle or a truck bed shell.

Figure 8:
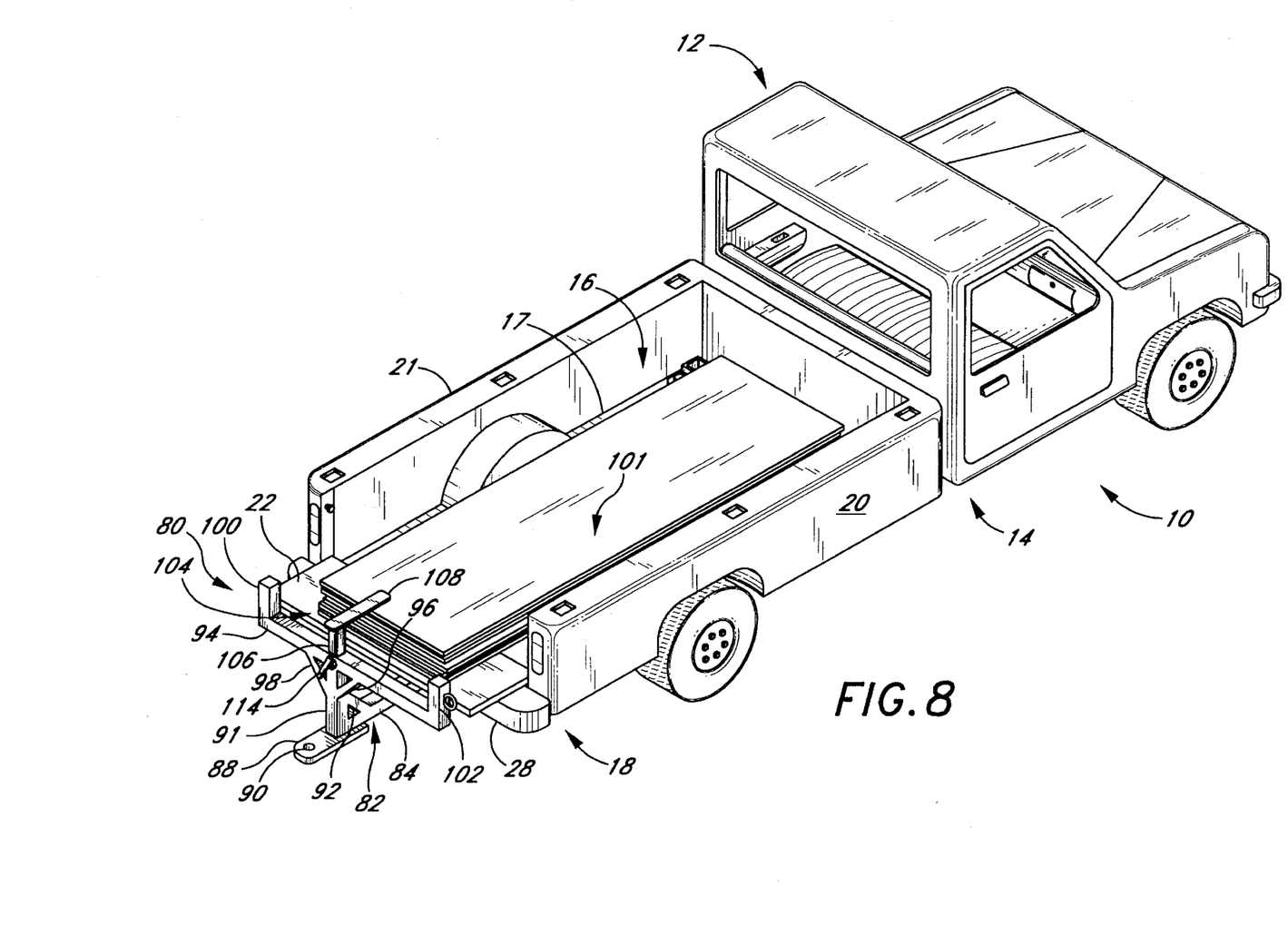
FIG. 8 is a rear perspective view of a tailgate fence in accordance with another preferred embodiment of the present invention, attached to a conventional pick-up truck.
Figure 9:
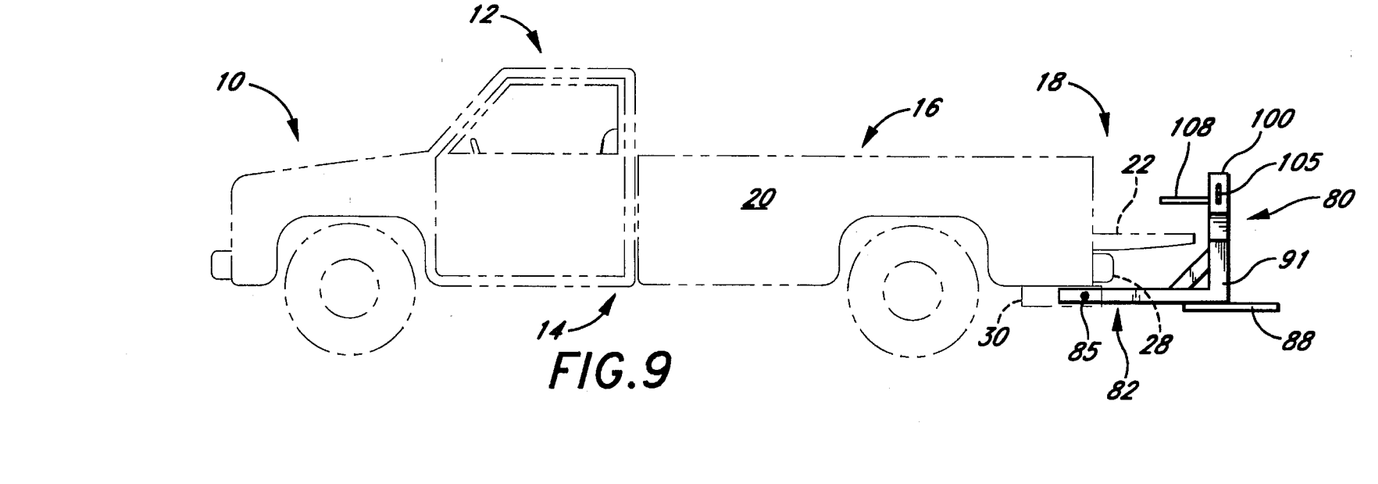
FIG. 9 is a side elevational view of the tailgate fence of FIG. 8.

The versatility of the present rack system 8 is further enhanced by a tailgate fence 80 which can be interchanged with the rear rack 24 described above. FIGS. 8 and 9 illustrate such a tailgate fence 80 which is configured in accordance with a preferred embodiment of the present invention. Like the above described rear rack 24, the present tailgate fence 80 is adapted to be easily attached to and removed from a truck via a conventional hitch receiver 30. The components of the present tailgate fence 80 will now be individually described in connection with the conventional pickup truck 10, described above.

The tailgate fence 80 is attached to the truck 10 by a hitch 82. As best seen in FIG. 9, the hitch 82 releasably engages the conventional hitch receiver 30 which allows the tailgate fence 80 to be detachably connected to the truck 10.

With reference to FIG. 8, the hitch 82 includes a hitch tongue 84 and an extension 88. The hitch tongue 84 is configured and shaped to slide into the hitch receiver 30. The hitch tongue 84 desirably has a uniform cross-sectional shape which corresponds with the shape of the hitch receiver 30, but is slightly smaller in size to be inserted easily into the hitch receiver 30. As seen in FIGS. 8 and 9, the hitch tongue 84 has a sufficiently long length such that when the hitch tongue 32 is inserted into the hitch receiver 30, the hitch tongue 32 extends beyond the rear end of the bumper 28 and the end of the extended tailgate 22.

With reference to FIG. 9, at least one lock pin 85 releasably connect the hitch tongue 84 to the hitch receiver 30. The pin 85 extends through corresponding apertures in the hitch receiver 30 and hitch tongue 84 with a hitch pin cotter (not shown) releasably connected to the end of the lock pin 85 to prevent accidental removal of the pin 85. This releaseable engagement between the hitch tongue 84 and the hitch receiver 30, which is locked by the pin 85, secures the tailgate fence 80 to the truck 10. The tailgate fence 80, however, can be quickly and easily disconnected by removing the lock pin 85 and pulling of the hitch tongue 84 from the hitch receiver 30.

With reference to FIG. 8, the extension 88 extends rearwardly from the hitch tongue 84. In the illustrated embodiment, the extension 88 is a relatively flat metal member that contains an aperture 90 located to the rear of the hitch tongue 84. The aperture 90 is configured to receive a conventional trailer hitch ball (not shown) to create a trailer hitch. This allows a trailer or other vehicle to be towed behind the truck 10 with the tailgate fence 80 installed.

As shown in FIGS. 8 and 9, the tailgate fence 80 includes the upright center post 91 that is integrally connected to the hitch tongue 84. The center post 91 generally extends perpendicular to the hitch tongue 84 with a support 92 bracing the connection between the hitch tongue 84 and center post 91. The support 92 preferably extends between the hitch tongue 84 and the center post 91 at about a 45° angle relative to both members 84, 91.

The center post 91 desirably extends from the hitch tongue 84 to a height proximate to or slightly below the tailgate 22 when lowered. For this purpose, in the illustrated embodiment, the length of the center post 91 is preferably about 16 inches (41 cm). It should be recognized and understood, however, that center post 91 can have any of a variety of lengths to suit a specific application.

At least one cross member 94 is connected to the center post 91. In the illustrated embodiment, the cross member 94 is attached to the upper end of the center post 91 with angled supports 96, 98 bracing the cross member 94 on the center post 91. The cross member 94 preferably extends perpendicular to the center post 91 in a direction which is generally parallel to the truck bed 16 and to the tailgate 22. The cross member 94 is preferably centrally located on the center post 91, and desirably has a length which is slightly less than the width of the truck bed 14. In the illustrated embodiment, the cross member 94 has a length of about 46 inches (117 cm).

Extensions 100 flank the ends of the cross members 94. The extensions 100 are preferably about 12 inches (30 cm) in length and are preferably perpendicularly attached so as to extend upwardly in a direction generally parallel to the center post 91. The extensions 100 prevent the elongated load (e.g., the plywood sheets 101 shown in FIG. 8) from sliding out the open rear end of the truck bed 16.

The extensions 100 may include one or more hooks or tie downs to attach ropes, straps, cords or the like to the tailgate fence 80 to tie the elongated load to the cross member 94. As seen in FIG. 8, these hooks or tie downs desirably are located on the outer sides of the extensions 100. In the illustrated embodiment, each tie down is a circular ring 105 that is attached near the upper end of the extension 100. It will be readily appreciated, however, that a wide variety of hooks or other types of known tie downs may be used to secure the elongated load to the tailgate fence 80.

Although the tailgate fence 80 may be constructed from a wide variety of materials, the tailgate fence 80 preferably is principally constructed of steel square tubes. The hitch tongue 84, central post 91, cross member 94, and extensions 100 desirably are all formed of square tubular segments which are welded together in the configuration described above to form a rigid welded structure. The lower support 92 and upper angled supports 96, 98 also are formed of square tubular segments which are welded between the hitch tongue 84 and the central post 91, and between the center post 91 and the cross member 94, respectively. The extension 88 also is welded to the bottom surface of the hitch tongue 84. It will be recognized by one of skill in the art, however, that the tailgate fence 80 can be constructed of a wide variety of materials including, for example, steel circular tubes, channel iron, or plastic segments that are relatively strong and rigid. The material selected preferably is one that is relatively lightweight to enable a single person to install and remove the tailgate fence 80. It also should be understood that the components of the tailgate fence 80 may be connected by other known means besides welding, such as, for example, by conventional fasteners, including nuts and bolts.

The tailgate fence 80 also includes a clamp 104 which is vertically adjustable relative to the floor 17 of the truck bed 16. The clamp 104 includes a post 106 that is telescopically inserted through the cross member 94 and into the center post 91. The clamp 104 also includes an arm 108 which cantilevers from the upper end of the clamp post 106. The arm 108 preferably extends toward the truck bed 16.

An adjustable stop 112 actuated by a handle 114 desirably locks the position of the clamp post 106 relative to the cross member 94. Movement of the handle 114 causes the stop 112 to frictionally engage and disengage the post 106. The clamp 104 thus may be adjusted in height to position the arm 108 to engage and hold the elongated load 101 within the truck bed 16. For instance, the clamp 104 can be adjusted to place the arm on the top sheet of plywood 101 to hold the rear end of the plywood sheets 101 against the floor 17 of the truck bed 16.

Although the tailgate fence 80 has been described in connection with a conventional pickup truck, it should be understood that the present tailgate fence 80 can be used with vehicles that have an enclosed cargo area as well. For example, the present tailgate fence 80 can be used with a truck having a shell covering the truck bed or with a sports utility vehicle.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A rack system for securing an elongated load to a truck, said truck having a cab and a truck bed formed in part by a floor, a pair of upstanding side walls, and a tail gate, said truck also including a hitch receiver positioned beneath and at the rear of said truck bed, said rack system comprising a front rack having a truss attached to and supported by a pair of spaced upstanding legs at a location behind the truck cab, and at least two quick-release fittings, each quick-release fitting being connected to one of said legs and being adapted to engage a stake well in one of the side walls of the truck bed to releasably attach said upstanding legs to the truck bed, and a rear rack attached to the truck independent of the front rack, said rear rack including a hitch tongue adapted to releasably engage the hitch receiver of the truck, a quick-release mechanism to releasably interconnect said hitch tongue and the hitch receiver, said hitch tongue extending beyond the rear end of the truck bed when connected to the hitch receiver, a post extending upward from said hitch tongue to a position at least above the tail gate of said truck bed, and a cross member attached to an upper end of said post.

2. A rack system as in claim 1, wherein said rear rack additionally includes an extension adapted to support a ball to form a trailer hitch.

3. A rack system as in claim 1, wherein said rear rack comprises a plurality of tie-downs attached to said cross member.

4. A rack system as in claim 1, wherein said post of said rear rack has a sufficient length such that said cross member lies above the tailgate of the truck.

5. A rack system as in claim 4, wherein said post is positioned on said hitch at a location which allows the tailgate of the truck to be lowered without contacting the post.

6. A rack system as in claim 1, wherein said cross member has a length of about 28 inches.

7. A rack system as in claim 1 additionally comprising a pair of footings which are attachable to the floor of the truck bed, each footing configured to releasably receive an end of one of said upstanding legs of said front rack.

8. A rack system as in claim 1, wherein said truss is sized to extend generally across the width of the truck bed.

9. A rack system as in claim 1, wherein said legs support said truss above the truck bed floor at a height which is generally above the top of the truck cab.

10. A rack system as in claim 1, wherein said post has a sufficient length such that said cross member lies at about the height of the roof of the truck cab.

11. A rack system as in claim 1, wherein said truss of said front rack and said cross member of said rear rack lie at about the same height above the truck bed floor when the front and rear racks are attached to the truck.

12. A rack system for a truck having a truck bed including a floor and a tail gate, said truck also including a hitch receiver positioned below said tail gate, said rack system comprising a tail gate fence including a hitch adapted to releasably engage the hitch receiver of the truck, said hitch configured to extend beyond an end of the truck, a post extending upward from said hitch to a position at least above the floor of the truck bed, a cross member attached to said post, a plurality of extensions which extend from said cross member and lie at at least partially above the floor of the truck bed, and an adjustable clamp at least partially inserted into said post in a telescopic manner and positioned above said cross member, said clamp being movable in a direction which is generally parallel to an axis of the post so as to be raised and lowered relative to said cross member, said clamp including an arm which projects toward the truck bed away from said cross member.

13. A method of attaching a rack system to a truck having a truck bed with a floor, sidewalls, and a tailgate, the truck also including a hitch receiver positioned beneath the truck bed, said method comprising the steps of:

providing a rear rack of said rack system with a hitch tongue which is configured to engage the hitch receiver;

inserting a hitch tongue of said rear rack into the hitch receiver;

releasably securing said hitch tongue in said hitch receiver by a quick-release mechanism;

positioning a post of said rear rack such that a cross member attached to said post lies above the tailgate of the truck;

providing a front rack of said rack system, said front rack being separate from said rear rack and having two upwardly extending legs that are spaced apart to be proximate said sidewalls of said truck bed, each of said legs having a compression fitting adapted to be inserted into a stake well in said sidewalls;

providing a pair of footings on the floor of the truck bed, said footings being sized to receive the ends of the front rack legs;

inserting the ends of said legs into said footings;

inserting said compression fittings into the corresponding stake wells in the truck bed sidewalls; and compressing said compression fittings such that the fittings swell to a size which prevents unintentional removal of said compression fittings from the stake wells to quickly attach said legs of said front rack to the truck.

14. A rack system as in claim 1, wherein said rear rack additionally comprises an angled support which extends between said post and said hitch tongue.

15. A rack system as in claim 1, wherein an upper portion of each upstanding leg extends above said truss of said front rack.

16. A rack system as in claim 1, wherein said upstanding legs and said truss are permanently fixed together.

17. A rack system as in claim 1, wherein each quick-release fitting comprises a compression fitting that includes a compression member which acts against an expandable member, and an actuator which moves said compression member from a first position, in which said expandable member rests in a first compression state, to a second position, in which said expandable member rests in a second compression state.

18. A rack system as in claim 17, wherein said expandable member has a cross-sectional size smaller than an opening size of the stake well when in said first compression state, and has a cross-sectional size larger than the opening size of the stake well when in said second compression state.

19. A rack system as in claim 17, wherein said actuator comprises a threaded shank coupled to an eyelet head having a sufficient size so as to be easily grasped by hand, said threaded shank cooperating with said compression member such that rotation of said shank in one direction moves said compression member toward said eyelet head and rotation of said shank in an opposite direction moves said compression member away from said eyelet head.

20. A rack system as in claim 12, wherein said post is positioned on said hitch at a location which allows the tailgate of the truck to be lowered without contacting the post.

21. A rack system for securing an elongated load to a truck which includes a cargo bed located behind a cab, said rack system comprising a front rack including a truss extending between two legs which support the truss above a floor of the cargo bed at a location behind the cab, and at least two quick-release fittings, each quick-release fitting being connected of one of said legs and being adapted to engage a stake well of a side wall of the cargo bed to releasably attach said leg to the side wall, a rear rack attached to said truck independent of the front rack, said rear rack including at least one leg which supports a cross member above the floor of the cargo bed, and a plurality of footings at least one of which releasably receives a lower end of one of said legs of said front rack, said footings being attached to the floor of said cargo bed.

22. A rack system as in claim 21, wherein said rear rack comprises a hitch tongue extending beyond a rear end of the cargo bed and adapted to releasably engage a hitch receiver of the truck, said leg of said rear rack extending upward from said hitch tongue to a position at least above the floor of said cargo bed, said cross member being attached to an upper end of said leg.

* * * * *